US006337981B1

United States Patent
Peters

(10) Patent No.: US 6,337,981 B1
(45) Date of Patent: Jan. 8, 2002

(54) METHOD TO PROVIDE A SERVICE, A SERVICE PROVIDER REALIZING SUCH A METHOD AND A UNIVERSAL PERSONAL TELECOMMUNICATION NETWORK INCLUDING SUCH A SERVICE PROVIDER

(75) Inventor: Marco Johannes Hubertus Peters, Bergen op Zoom (NL)

(73) Assignee: Alcatel, Paris (FR)

(*) Notice: Subject to any disclaimer, the term of this patent is extended or adjusted under 35 U.S.C. 154(b) by 0 days.

(21) Appl. No.: 09/340,675

(22) Filed: Jun. 29, 1999

(30) Foreign Application Priority Data

Jul. 3, 1998 (EP) .............................. 98401676

(51) Int. Cl.⁷ ................................. H04B 7/00
(52) U.S. Cl. .................... 455/432; 455/433; 455/445
(58) Field of Search .................... 455/432, 433, 455/434, 435, 436, 445, 450, 452, 458, 422

(56) References Cited

U.S. PATENT DOCUMENTS 5,915,218 A * 6/1999 Talagery et al. ............ 455/433
5,930,714 A * 7/1999 Abu-Amara et al. ........ 455/433

FOREIGN PATENT DOCUMENTS

WO    WO 97/07641    2/1997

OTHER PUBLICATIONS

European TelecommunicationStandards Institute Standard, EMTS 22.70 version 3.0.0, TR 22.70 V3.0.0, Mar. 1998, pp. 1–13.

G.P. Eleftheriadis et al., "User Profile Identification in Future Mobile Telecommunications Systems", *IEEE Network*, Sep./Oct. 1994, pp. 33–39.

R. Becher et al., "CAMEL: The Impact of Personal Communications on Intelligent Networks", *ISS '97*, XVI World Telecom Congress Proceedings, vol. 2, Sep. 1997, pp. 225–233.

M. Torabi et al., "Third–Generation Mobile Telecommunications and Virtual Home Environment: A Prioritization Analysis", *Bell Labs Technical Journal*, vol. 3, No. 3, Jul.–Sep. 1998, pp. 50–62.

* cited by examiner

*Primary Examiner*—Thanh Cong Le
(74) *Attorney, Agent, or Firm*—Sughrue Mion, PLLC

(57) ABSTRACT

A method to provide a service to a user of a subscriber in a universal personal telecommunication network. The method includes the step of requesting access by the user to the telecommunication network via a terminal and via an access subnetwork of the telecommunication network in order to provide thereby an access request. The method further includes the step of providing by a notifying service provider to the user via the access subnetwork, a notification which includes a capability to accept a service of an offered service provider. In the event that the notifying service provider is a home service provider of the user, the offered service provider is different from the notifying service provider. The offered service is a virtual visited environment similar to a virtual home environment but identified by the user as visitor and the offered service provider.

9 Claims, 1 Drawing Sheet

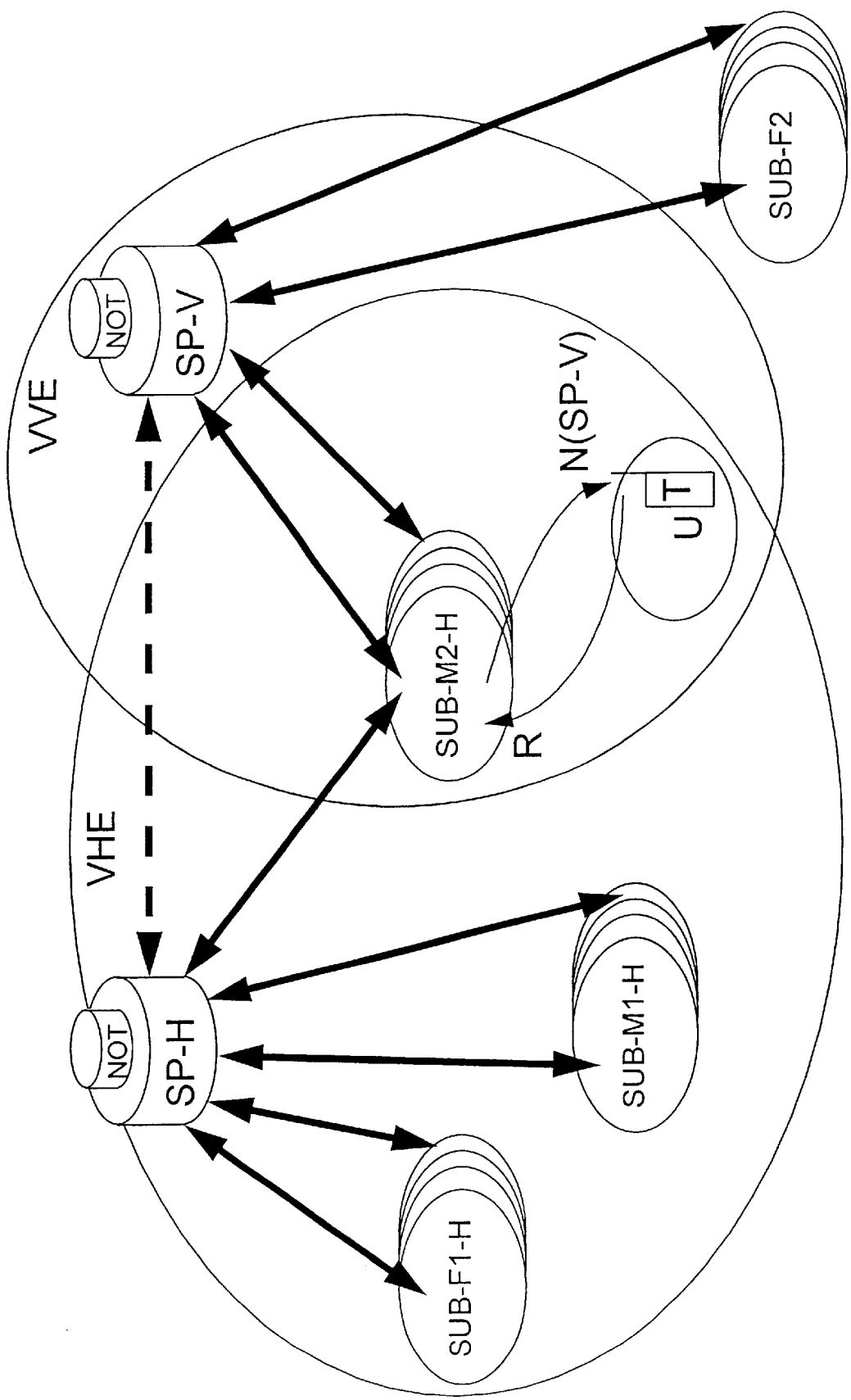
Figure

METHOD TO PROVIDE A SERVICE, A SERVICE PROVIDER REALIZING SUCH A METHOD AND A UNIVERSAL PERSONAL TELECOMMUNICATION NETWORK INCLUDING SUCH A SERVICE PROVIDER

BACKGROUND OF THE INVENTION

The present invention relates to a method to provide a service in a universal personal telecommunication network, a service provider realizing such a method and a universal personal telecommunication network including such a service provider.

Such service provider is already known in the art, e.g. from the European Telecommunication Standards Institute Standard at the internet site with the address:

http://docbase.etsi.fr/Tech-org/smg/Document/smg1/SMG1-UMTS-Specifications/NEW/ with reference TR 22.70 V3.0.0 (1998–03) entitled "Universal Mobile Telecommunication System (UMTS); Service Aspects; Virtual Home Environment (VHE) (UMTS 22.70 version 3.0.0).

This document describes the Virtual Home Environment concept and its constituent parts. A concept called service environment is introduced to describe how virtual home environment services will be made available on demand to a user traveling with its terminal in any location. The concept of virtual home terminal is discussed in order to describe how a virtual home environment can be made available in any terminal.

The following paragraphs are describing a summary of this document, in order to provide an indication of the background art which can be regarded as useful for understanding the invention.

A virtual home environment is defined as a system concept for personalized service portability, across network boundaries and between terminals. The concept of the virtual home environment is such that universal personal telecommunication system UMTS users are consistently presented with the same personalized features in whatever network and whatever terminal, wherever the user may be located. The exact configuration available to a user at any instant will be dependent upon the capabilities of the user service identity module, called hereafter USIM, terminal equipment and network currently being used or on the subscription restriction. Such a USIM is a unique personal identification of a user to a subscriber and a service provider. A user with its USIM in another terminal, receives maximum capability provided depending on the limitation of the terminal. A virtual home environment is created by a combination of the capabilities located in the service provider, network operators and the terminal equipment. In effect, the virtual home environment of a user is considered as a distributed user profile. The profile outline is owned by the service provider, and it is distributed between the terminal equipment, personal identification card, network operator and service provider. This means that to the service provider, the virtual home environment appears as a list of capabilities, preferences and settings appropriate to the user and its subscriber. It is also described in the above cited document that a commercial relationship is required between a service provider and a network operator, either directly or indirectly.

The components involved in realization of a virtual home environment of a user are the following: one user, one service provider, one or more value added service providers i.e. content providers of services such as video on demand or entertainment information provider, one USIM i.e. unique personal identification of the user, one IC card, one subscriber, one subscription of the subscriber to the above mentioned service provider, one or more terminals, one or more network operators.

A user is associated with one service provider and the service provider provides virtual home environment according to the subscription. The service provider can use a plurality of network operators in order to support the virtual home environment for the user.

Individual users have a virtual home environment which is based on a subset of the total services. Whilst the user may have a set of services he would expect to be offered, these are only offered if permitted by the subscriber and the service provider. From the users point of view, the use of the network is hidden.

In order to disclose the invention as claimed, the following paragraph describes an example.

Presume a universal personal telecommunication network which includes a subnetwork. According to the virtual home concept a user, being identified with its personal identification number is associated to one service provider, called its home service provider. The home service provider provides a virtual home environment according to the subscription of the user. Presume that this home service provider has a commercial relationship with this subnetwork e.g. a mobile subnetwork, called hereafter a home subnetwork. The home subnetwork is attached to the home service provider. Furthermore, presume that the home service provider offers access for all its subscribers to a list of services e.g. hotel information, roadmap information, flight information of the airport, restaurant information, etc.

In the event that the user desires to get access to the personal telecommunication network, the user submits an access request via a terminal e.g. its mobile telephone and via the home subnetwork to the universal personal telecommunication network. The home service provider provides a notification to the user which includes the capability for the user to accept the list of services of its home service provider. In this way, the user can select this offered service and, furthermore, can select e.g. the offered hotel information.

In the event when the user makes a journey, the user can get access to the telecommunication network due to:

an agreement between the operator of its home subnetwork or its home service provider and an operator of a subnetwork in the environment of its destination or the service provider whereto this other subnetwork is attached also due to a commercial agreement; and the right settings of its user profile offered by its subscriber and its home service provider.

Indeed, an interworking between the two subnetworks is required as well as the permission for the user to get access to the telecommunication network via another subnetwork. When the user, at the destination of its journey, makes an access request with its mobile telephone to the telecommunication network, the access is requested via this other subnetwork i.e. a mobile network, called hereafter access subnetwork. Due to the existing interworking between the access subnetwork and the home subnetwork the profile of the user can be checked. When the profile of the user permits access via this access subnetwork, the home service provider of the user provides a notification to the user which includes the capability for the user to accept the list of services of its home service provider. In this way, the user can select this offered service and, furthermore, can select e.g. the offered hotel information. However, the offered hotel information is mostly information of the local environment of its home service provider e.g. the coverage area of the home subnetwork.

In fact, the offered services by the home service provider are the same whatever the terminal's position within the telecommunication network. The services offered to the user, at its home area or at a visited area, are the services of its home service provider offered by its home service provider via a home subnetwork or via a subnetwork of the visited area.

SUMMARY OF THE INVENTION

An object of the present invention is to provide a method to provide a service to a user, such as of the above known type but which has not the above drawback of offering to a user only the services of a home service provider, if any.

According to the invention, this object is achieved by a method which includes the step of requesting access by the user to the telecommunication network via a terminal (T) and via an access subnetwork (SUB-M2-H) of the telecommunication network in order to provide thereby an access request (R), upon receiving the access request (R), providing by a notifying service provider (SP-H) to the user (U) via the access subnetwork (SUB-M2-H), a notification (N(SP-V)) which includes a capability to accept a service of an offered service provider (SP-V), in the event said notifying service provider is a home service provider of said user (U), the offered service provider is different from the notifying service provider, the service being a virtual visited environment (WE) similar to a virtual home environment (VHE) but identified by the user (U) and the offered service provider (SP-V).

The object of the invention is further achieved by a service provider realizing the above method and by a telecommunication network including such a service provider.

Indeed, by including in the method the step of providing by a notifying service provider to the user via an access subnetwork, i.e. the subnetwork via which the user requests access to the telecommunication network, a notification which includes a capability to accept a service of an offered service provider, a virtual visited environment is offered to the user. Such a virtual visited environment is similar to a virtual home environment but is identified by the user and the offered service provider, which can be e.g. totally different of its home service provider. In this way, the concept virtual visited home environment, is offered to the user. Such a virtual visited home environment offers to the user the same way and feel independent of the terminal and the network in use, over both fixed and mobile access networks, and on different type of terminals varying from simple voice only terminals to powerful laptops. It has to be understood that similar as to the user profile as defined in the above mentioned standard for the virtual home environment, also a visited user profile has to be defined. Usually, such a visited user profile will be more restricted as compared with a general home user profile. On the other hand, such a visited user profile might offer alternative payment methods which offers, once fulfilled, the possibility to select a broader list of services.

It has to be remarked that in an embodiment of the present invention, in the event when the notifying service provider is the home service provider of the user, the offered service provider is different of the notifying service provider. Indeed, in the event when the notifying service provider and the offered service provider are both constituted by the home service provider, the home service provider provides to the user a notification which includes a capability to accept a service of itself, which brings us in the above mentioned prior art situation.

An advantage of such a universal personal telecommunication network which includes a plurality of service providers whereof each one of the service provider includes a notifying means to provide such a notification to the user, is that a user can go anywhere in the area of the telecommunication network, i.e. the area covered by the subnetworks being associated to anyone of the plurality of service providers, and upon requesting access to the telecommunication network via one of these subnetworks, called access subnetwork, the user is enabled to accepts a service of anyone of these service providers, called offered service provider, which is offered by anyone of these service providers, called notifying service provider.

It has to be remarked that, in the event when the offered service provider and the notifying service provider are different service providers, an interworking, direct or indirect, between one of the subnetworks associated to the offered service provider and one of the subnetworks associated to the notifying service provider, is evident to a person skilled in the art.

A first embodiment of the present invention is that the notifying service provider is constituted by a service provider which is associated to the access subnetwork whereby a virtual environment is identified with the service provider and the access subnetwork.

Another possible implementation is that, in the event when the service provider according to the invention i.e. the notifying service provider being associated to the access subnetwork, is also constituted by the offered service provider. This provides for the situation where, referring to the above mentioned example of the service of hotel information, the service provider associated with the accessed subnetwork, at a visited location, is enabled to offer its own services to users which are visiting its area. The offered hotel information will be information of the local hotels. It has to be remarked that the service is offered by the service provider, even when no interworking between the access subnetwork and the home subnetwork is established and even more, also when the user has no home subnetwork at all. Indeed, the offered services by the offered service provider might be free of charge or on the other hand might include possibilities to pay e.g. with credit cards in order to get access to more services which are not free of charge anymore.

Yet, another possible implementation is similar to that described above, but differs in that the offered service provider is different from the notifying service provider. This provides for the situation that the notifying service provider, being associated with the access subnetwork, provides a notification which includes the capability to the user to accept a service of a related service provider e.g. the service provider with which a neighboring subnetwork is associated but with which a commercial agreement is established. In the event when such an offered service provider is the home service provider, the service provider of the invention provides the notification to the user to accept the services of its offered home service provider or not.

Another possible implementation is, still in the situation that the notifying service provider is associated with the access subnetwork, that the notifying service provider is also the home service provider of the user. This provides for the situation that a user which requests access in its home area i.e. the area of its home subnetwork, receives a notification of its home service provider which includes the capability to the user to accept, besides the services of its home service provider, also the services of other service providers e.g. service providers which are associated with neighboring subnetworks. In this way, again following the example of hotel information, the user is enabled to accept from its home service provider, the service of the service provider of the area which he is going to visit and to inquire the information of the hotels of the visited area in advance.

Yet, another implementation is that the notifying service provider is not associated with the access subnetwork. As already mentioned above, it has to be understood that in this situation, in order to provide a notification by the notifying service provider to the user via one of its own associated subnetworks and via the access subnetwork, that both subnetworks are interworking with each other. The service provider of the invention in such a situation may also be constituted by the home service provider of the user. In this way, it is the home service provider of the user which offers the service of other service providers via the access subnetwork.

Finally, similar to the above situation, the offered service provider may be associated with the access subnetwork. Indeed, the user being in a visited location and requesting access via an access subnetwork which is not its home subnetwork, receives a notification, via a home subnetwork associated with its home service provider and via the access subnetwork, which includes the capability to accept the services of the local visited service provider. Again, the user is enabled to accept the service of this local service provider and to select the information of the local hotels.

BRIEF DESCRIPTION OF THE DRAWINGS

The above and other objects and features of the invention will become more apparent and the invention itself will be best understood by referring to the following description of a not limiting embodiment taken in conjunction with the accompanying drawings wherein FIG. 1 illustrates the system concept of a virtual home environment of a user and a virtual visited environment for this user.

DETAIL DESCRIPTION OF THE INVENTION

First, the working of the method of the present invention will be explained by means of a functional description of the functional blocks shown in the figure. Based on this description, implementation of the functional blocks will be obvious to a person skilled in the art and will therefor not be described in detail. In addition, the principle working of the method to provide a service will be described by means of an example of a possible situation which is a preferred embodiment of the present invention.

In a universal personal telecommunication network a user U is associated with its subscriber and its home service provider SP-H. A virtual home environment VHE is a system concept which provides personal service portability across network boarders and between terminals. The concept virtual home environment is such that the user U is consistently presented with the same personalized features, user interface capabilities and services in whatever network and whatever terminal, wherever the user may be.

The FIGURE shows this virtual home environment concept VHE for a user U. A subscriber (not shown in the Figure) has an commercial agreement i.e. a subscription with the home service provider SP-H. The subscriber authorizes to user U to use some predefined services under this commercial agreement. Presume that this service provider SP-H is located in Antwerp. The home service provider SP-H has one or more relations with network operators. The FIGURE shows a relation between the home service provider of user U and:

a plurality of fixed subnetworks SUB-F1-H;

a first plurality of mobile subnetworks SUB-M1-H; and a second plurality of mobile subnetworks SUB-M2-H.

In order not to overload the figure only the first one of each plurality is shown. Presume that the plurality of fixed subnetworks SUB-F1-H and the first plurality of mobile subnetworks are each covering the area of Belgium. Furthermore, presume that the second plurality of mobile subnetworks is covering the area of Italy.

The system concept virtual home environment VHE of the user U provides to the user U the same look and feel of a service independent of the used terminal and network.

It has to be explained that the service provider SP-H offers a set of services whereof a list of hotels in the environment of Antwerp. This list includes the telephone numbers, addresses, ranking and standard prices of the hotels in the environment of Antwerp. These services are free of charge and are offered to its subscribed users but are also offered to no subscribed users via a virtual visited environment. This virtual visited environment will be explained in a further paragraph.

Now, as it is shown in the FIGURE, additional relations are established between:

the second plurality of mobile subnetworks SUB-M2-H and another service provider i.e. SP-V, located in Milan, and called hereafter the visited service provider which will be explained in a further paragraph;

this visited service provider SP-V and a second plurality of fixed subnetworks SUB-F2; and even more, also between the two mentioned service providers SP-H and SP-V.

The relation between the visited service provider SP-V and the second plurality of fixed subnetworks SUB-F2 is mentioned e.g. in order to illustrate that the mentioned relations are not limitative and that still other relations (not shown) are possible between service providers and subnetworks.

Similar to the offered services of the home service provider, also the visited service provider at Milan, offers a set of services. This list of services is again including a list of hotels, but this time, of the environment of Milan. The list of hotels is again offered, free of charge, to its subscribed users but also to no subscribed users by means of a virtual visited environment.

In this preferred embodiment the terminal used by the user U is defined to be a personal mobile telephone set T.

According to the present invention, once the user U requests access to the personal telecommunication network via its terminal T, a notification will be provided to the user U. Presume that according to the commercial relation between the two service providers the following agreement has been established:

in the event when a user, which is associated with one of the two service providers being its home service provider e.g. SP-H, requests access via a subnetwork e.g. SUB-M2-H which also has a commercial relation with the other service provider e.g. SP-V, the notifying service provider is constituted with the home service provider SP-H and besides its own services, the notifying service provides a notification to the user which includes a capability to accept a service of the other service provider SP-V which constitutes thereby the offered service provider. This agreement means that as well the home service provider SP-H as the visited service provider must be able to fulfill the notification according to the invention. Indeed, in the event of a second user (not shown) being associated with the visited service provider as its home service provider, the roles of notifying service provider and offered service provider are exchanged between both service providers SP-H and SP-V.

In order to execute the notification according to the invention each service provider SP-H and SP-V includes a notifying means, i.e. NOT, to provide a notification to a user. Such a notifying means includes in fact the capability to open to a user the door to another service provider i.e. the offered service provider. It has to be understood that this requires the necessary information at the notifying service provider to identify and to establish a communication between the user and the offered service provider.

At the side of the offered service provider, a virtual visited environment is identified by the means of service subscription following a visitor profile. This means that a user which receives the services of a service provider via a notification of a notifying service provider, only receives the services following the subscription of the visitor profile.

In order to explain the principle working of the method of the invention, an example of a possible situation is described hereafter.

Presume the situation as above described. A user with its home service provider in Antwerp which is associated with three plurality of subnetworks SUB-F1-H, SUB-M1-H and SUB-M2-H covering the area of Belgium, Belgium and Italy respectively. In the event when the user U travels to Milan and desires to require hotel information of the local place, i.e. Milan, he first executes an access request R to the universal personal telecommunication network, via its mobile telephone T and via the mobile telephone network of the environment i.e. subnetwork SUB-M2-H. It has to be remarked that following the invention this subnetwork SUB-M2-H is defined as the access subnetwork. The access subnetwork is associated with the service provider in Milan SP-V which is defined hereby as the visited service provider. The subnetwork SUB-M2-H and the visited service provider SP-V are defining together a virtual environment.

Due to the personal identification number of the user U, the service provider SUB-M2-H knows that the user U has its subscription via a subscriber with the service provider SP-H in Antwerp i.e. the home service provider. On the other hand, the fact that the access request is entered via the access subnetwork SUB-M2-H which has also a relation with the service provider in Milan SP-V i.e. the visited service provider and due to the commercial agreement between the home service provider SP-H and the visited service provider SP-V, the home service provider SP-H creates a notification in its notifying means and provides this notification N(SP-V) via the access subnetwork SUB-M2-H to the user U. This notification N(SP-V) includes a capability to accept a service of an offered service provider which is in this case the visited service provider SP-V. The offered service is the virtual visited environment identified by the user and the visited service provider SP-V. The user accepts this offered service and receives services in line with the subscription of the visitor profile. The services offered by the offered service provider are restricted following the subscriptions of the visitor profile. However, as it is mentioned above, a list of the hotels of Milan is offered free of charge to the visited user whereby the user is enabled to make an inquire of this list.

It has to be remarked that although in the preferred embodiment a mobile telephone has been chosen as the terminal via which the user communicates, the application of the invention is not limited to only mobile telephone sets. Indeed, as explained following the system concept of a virtual home environment and similar following the system concept of a virtual visited environment, small modifications evident to a person skilled in the art, may be applied to the above described embodiment in order to adapt it to be integrated with other kind of terminals e.g. a portable personal computer or a mobile telephone set integrated in a car.

While the principles of the invention have been described above in connection with specific apparatus, it is to be clearly understood that this description is made only by way of example and not as a limitation on the scope of the invention, as defined in the appended claims.

What is claimed is:

1. A method to provide a service to a user (U) in a universal personal telecommunication network, wherein said method includes the step of requesting access by said user to said telecommunication network via a terminal (T) and via an access subnetwork (SUB-M2-H) of said telecommunication network in order to provide thereby an access request (R), characterized in that said method further includes the step of upon receiving of said access request (R), providing by a notifying service provider (SP-H) to said user (U) via said access subnetwork (SUB-M2-H) a notification (N(SP-V)) which includes a capability to accept a service of an offered service provider (SP-V), and in the event that said notifying service provider is a home service provider of said user (U), said offered service provider is different from said notifying service provider, and said service is a virtual visited environment (VVE) similar to a virtual home environment (VHE) but identified by said user (U) and said offered service provider (SP-V).

2. A service provider (SP-H) to provide a service to a user (U) in a universal personal telecommunication network upon receiving of an access request (R) from said user (U) via a terminal (T) and via an access subnetwork (SUB-M2-H) of said telecommunication network, characterized in that said service provider (SP-H) includes a notifier (NOT) to provide a notification (N(SP-V)) to said user (U) via said access subnetwork (SUB-M2-H), said notification (N(SP-V)) including a capability for said user to accept a service of an offered service provider (SP-V), and in the event that said service provider is a home service provider of said user (U), said offered service provider is different from said service provider, and said service being a virtual visited environment (VVE) similar to a virtual home environment (VHE) but identified by said user (U) and said offered service provider (SP-V).

3. A service provider according to claim 2, characterized in that said service provider is associated with said access subnetwork whereby a virtual environment is identified with said service provider and said access subnetwork.

4. A service provider according to claim 3, characterized in that said service provider is also constituted by said offered service provider.

5. A service provider according to claim 3, characterized in that said offered service provider is constituted by a home service provider of said user.

6. A service provider according to claim 3, characterized in that said service provider is also constituted by a home service provider of said user whereby said virtual environment is constituted by a virtual home environment of said user.

7. A service provider according to claim 2, characterized in that in the event when said service provider is not associated with said access subnetwork (SUB-M2-M) said service provider is also constituted by a home service provider (SP-H) of said user.

8. A service provider (SP-H) according to claim 7, characterized in that said offered service provider (SP-V) is associated with said access subnetwork (SUB-M2-M) whereby a virtual environment is identified with said access subnetwork (SUB-M2-M) and said offered service provider (SP-V).

9. A universal personal telecommunication network, characterized in that said telecommunication network includes at least one service provider (SP-H) to provide a service to a user (U) in said universal personal telecommunication network upon receiving an access request (R) from said user (U) via a terminal (T) and via an access subnetwork (SUB-M2-H) of said telecommunication network, characterized in that said service provider (SP-H) includes a notifier (NOT) to provide a notification (N(SP-V)) to said user (U) via said access subnetwork (SUB-M2-H), said notification (N(SP-V)) including a capability for said user to accept a service of an offered service provider (SP-V), and in the event that said service provider is a home service provider of said user (U), said offered service provider is different from said service provider, and said service being a virtual visited environment (VVE) similar to a virtual home environment (VHE) but identified by said user (U) and said offered service provider (SP-V).

\* \* \* \* \*